US012061471B2

(12) United States Patent
Leung et al.

(10) Patent No.: US 12,061,471 B2
(45) Date of Patent: Aug. 13, 2024

(54) WEARABLE REMOTE CONTROL DEVICE AND TRACKING SYSTEM

(71) Applicant: Logistics and Supply Chain MultiTech R&D Centre Limited, Pok Fu Lam (HK)

(72) Inventors: Chow Wing Leung, Pok Fu Lam (HK); Wai Tik Sze, Pok Fu Lam (HK); Wong Shuk Hang, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 250 days.

(21) Appl. No.: 17/685,667

(22) Filed: Mar. 3, 2022

(65) Prior Publication Data
US 2023/0280741 A1    Sep. 7, 2023

(30) Foreign Application Priority Data

Mar. 1, 2022   (HK) ........................... 32022049064.5

(51) Int. Cl.
  *G05D 1/00*   (2024.01)
  *A41D 19/00*  (2006.01)
  *G06F 3/01*   (2006.01)

(52) U.S. Cl.
  CPC ....... *G05D 1/0016* (2013.01); *A41D 19/0024* (2013.01); *G06F 3/014* (2013.01); *G06F 3/017* (2013.01)

(58) Field of Classification Search
  CPC ........ G05D 1/0016; G05D 1/08; A63B 63/06; G06F 3/014; G06F 1/1662; G06F 3/011;
  (Continued)

(56) References Cited

U.S. PATENT DOCUMENTS 5,688,196 A * 11/1997 O'Neil ................... A63B 63/06
                                                  473/439
2013/0113709 A1 * 5/2013 Wine ...................... G06F 1/163
                                                  345/169

(Continued)

FOREIGN PATENT DOCUMENTS

CA        3051668  A1 *  5/2018  ............. B64C 13/00
DE    102017006924  A1 *  3/2018  ........... B60R 25/245

*Primary Examiner* — Yuri Kan

(74) *Attorney, Agent, or Firm* — Renner, Kenner, Greive, Bobak, Taylor & Weber

(57) ABSTRACT

A wearable remote control device 1 for controlling a movable equipment 10 includes a wearable carrier 2 adapted for being worn on a user's hand, a control interface 3 configured for converting user's input into instructions; a communication module 4 configured for sending the instructions receivable by the movable equipment 10, an actuation interface 5, and a tracking module 6 configured for being actuated by the actuation interface 5. The actuation interface 5 includes an actuation module 51 adapted for being actuated by the user's hand, and a gesture sensing module 52 configured for detecting a predetermined hand gesture. Upon the actuation module 51 is actuated, the actuation interface 5 provides a tracking signal 61 receivable by the movable equipment 10 for determining a traveling path with respect to movements of the wearable remote control device 1.

20 Claims, 2 Drawing Sheets

(58) Field of Classification Search
CPC ....... G06F 3/0482; G06F 1/163; G06V 40/28; G01C 21/26; A63H 27/12; G08C 17/02; B60R 25/245; B64C 13/00
See application file for complete search history.

(56) References Cited

U.S. PATENT DOCUMENTS

| | | | |
|---|---|---|---|
| 2015/0031348 A1* | 1/2015 | Lee | G06F 3/0482 |
| | | | 455/418 |
| 2015/0193003 A1* | 7/2015 | Yamada | G06F 3/011 |
| | | | 345/156 |
| 2016/0347280 A1* | 12/2016 | Daman | G08C 17/02 |
| 2017/0031446 A1* | 2/2017 | Clark | A63H 27/12 |
| 2018/0194274 A1* | 7/2018 | De Baca | G01C 21/26 |
| 2018/0275859 A1* | 9/2018 | Hodge | G06F 1/1662 |
| 2019/0056725 A1* | 2/2019 | Su | G05D 1/08 |
| 2019/0121522 A1* | 4/2019 | Davis | G06V 40/28 |
| 2019/0179412 A1* | 6/2019 | Penmatcha | G06F 3/014 |
| 2022/0206587 A1* | 6/2022 | Da-Yuan | G06F 3/014 |

* cited by examiner

WEARABLE REMOTE CONTROL DEVICE AND TRACKING SYSTEM

FIELD OF THE INVENTION

The present invention relates to a remote control device and tracking system. Particularly, the present invention pertains to a wearable remote control device for controlling a movable equipment and a tracking system incorporating the wearable remote control device.

BACKGROUND

Warehouses are used for temporarily storing goods or produce and to provide access to the goods or produce for fulfilling future purchase orders. Generally, manual labor is typically required to receive, store, perform inventory audit, and retrieval for the goods or produce. Managing the operations of the warehouse and minimizing the costs of operations and transportation can often be a challenge for warehouse operators. Typically, warehouse operators employ goods handling vehicles, such as forklifts or pallet stackers, to reduce the dependency on labor in the warehouse. A forklift or pallet stacker is a vehicle used in a warehouse for various purposes such as lifting and transporting heavy items, and placing pallet of goods by stacking one pallet on top of another. However, each of these machineries requires a dedicated and skilled operator, i.e., on board the cockpit, in order to carry out its intended functions safely and effectively. Accordingly, in the midst of warehouse labor shortages, there exists the need for a remote control device and tracking system for use with goods handling vehicles for improving warehouse operating productivity.

SUMMARY OF THE INVENTION

The present invention proposes using a wearable remote control device for remote controlling a movable equipment, such as a goods handling vehicle, and a tracking system for providing tracking functionality for the movable equipment to follow the movement of the wearable remote control device.

According to a first aspect of the present invention, there is provided a wearable remote control device for controlling a movable equipment, comprising:
- a wearable carrier adapted for being worn on a user's hand;
- a control interface configured for converting user's input into instructions;
- a communication module configured for sending the instructions receivable by the movable equipment;
- an actuation interface; and
- a tracking module configured for being actuated by the actuation interface;
- wherein the actuation interface comprises:
  - an actuation module, provided on the wearable carrier, adapted for being actuated by the user's hand; and
  - a gesture sensing module configured for detecting a predetermined hand gesture performed by the user's hand;
- upon the predetermined gesture performed by the user's hand is detected by the gesture sensing module and the actuation module is actuated by the user's hand, the actuation interface actuates the tracking module and provides a tracking signal receivable by the movable equipment for determining a traveling path with respect to movements of the wearable remote control device.

In an embodiment, the actuation module comprises a touch interface.

In another embodiment, the actuation module comprises a button interface.

In an embodiment, the touch interface or button interface comprises at least one actuator configured for engaging with a finger of the user.

Preferably, the at least one actuator is a capacitive touch sensor.

In an embodiment, the at least one actuator is located at a location on the wearable carrier reachable by a thumb or an index finger of the user's hand.

In an embodiment, the at least one actuator is located on the wearable carrier in a vicinity of a thumb of the user's hand wearing the wearable carrier.

In an embodiment, the actuation module is actuated by the index finger engaging with the at least one actuator.

In an embodiment, the at least one actuator is located on the wearable carrier in a vicinity of an index finger of the user's hand wearing the wearable carrier.

In an embodiment, the actuation module is actuated by the thumb engaging with the at least one actuator.

Preferably, the gesture sensing module comprises a gyroscope and a gesture recognition module configured for identifying the predetermined hand gesture performed by the user's hand.

In an embodiment, the gesture sensing module is configured to detect the predetermined gesture of which the user's hand wearing the wearable carrier is pointing downward.

In an embodiment, the tracking module is actuated by the finger engaging the at least one actuator while with the user's hand wearing the wearable carrier performing the predetermined gesture.

Preferably, the wearable carrier is a glove adapted for partially covering the user's hand with its fingers exposed.

In an embodiment, the control interface comprises directional control buttons for controlling the movable equipment to move forward, reverse, left or right.

In an embodiment, the control interface comprises control buttons for controlling the movable equipment to lift up or lower down.

According to a second aspect of the present invention, there is provided a tracking system for a movable equipment, comprising:
- a wearable remote control device according to any one of the preceding claims;
- a tracking receiver provided on the movable equipment for receiving the tracking signal;
- an on-board control module configured for processing the tracking signal and controlling the movement of the movable equipment with respect to the tracking signal.

In an embodiment, the system comprises an ultra-wideband transceiver on each of the movable equipment and the wearable remote control device for determining, based on the tracking signal, a distance between the wearable remote control device and the movable equipment. That is, the tracking module of the wearable remote control device and the tracking receiver of the movable equipment each comprise the ultra-wideband transceiver.

In an embodiment, the system comprises an ultra-wideband transceiver on each of the movable equipment and the wearable remote control device for determining, based on the tracking signal, a position of the wearable remote control device with respect to the movable equipment. That is, the tracking module of the wearable remote control device and the tracking receiver of the movable equipment each comprise the ultra-wideband transceiver.

In another embodiment, the tracking system is configured such that upon actuation of the tracking module, the on-board control module controls the movable equipment to follow a path after the wearable remote control device.

DESCRIPTION OF THE PREFERRED EMBODIMENTS

The following clearly and completely describes the technical solutions in the embodiments of the present invention with reference to the accompanying drawings. Apparently, the described embodiments are merely some but not all of the embodiments of the present invention. All other embodiments based on the embodiments of the present invention and obtained by a person of ordinary skill in the art without investing creative efforts shall fall within the scope of the present invention.

Figure 2:
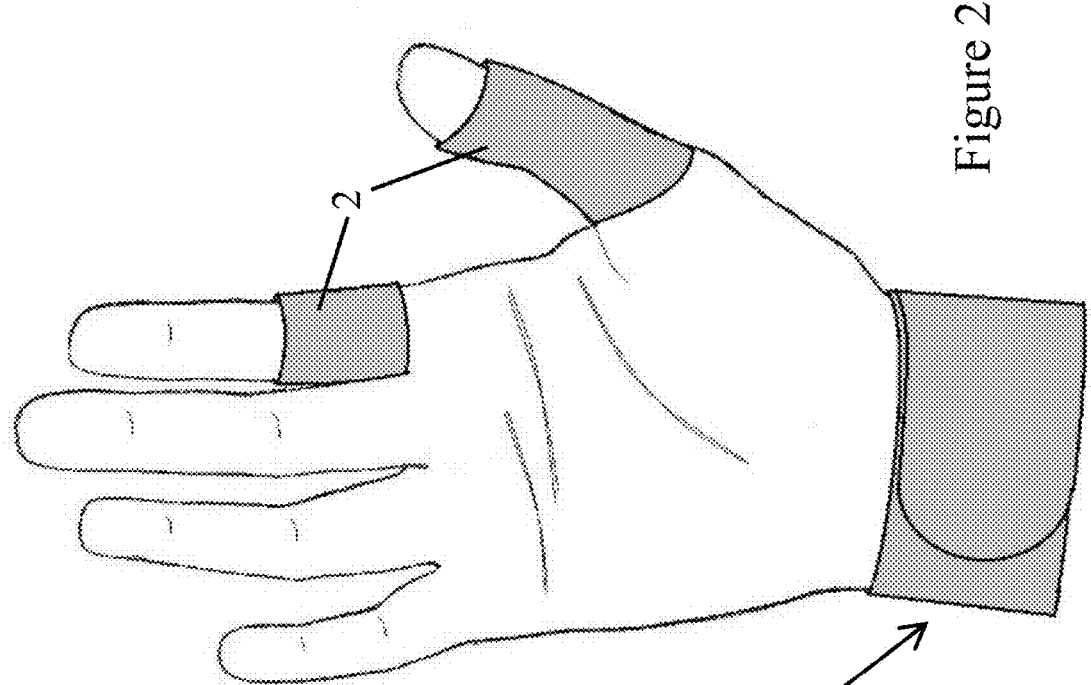
FIG. 2 shows a ventral side of the wearable remote control device in FIG. 1.
Figure 1:
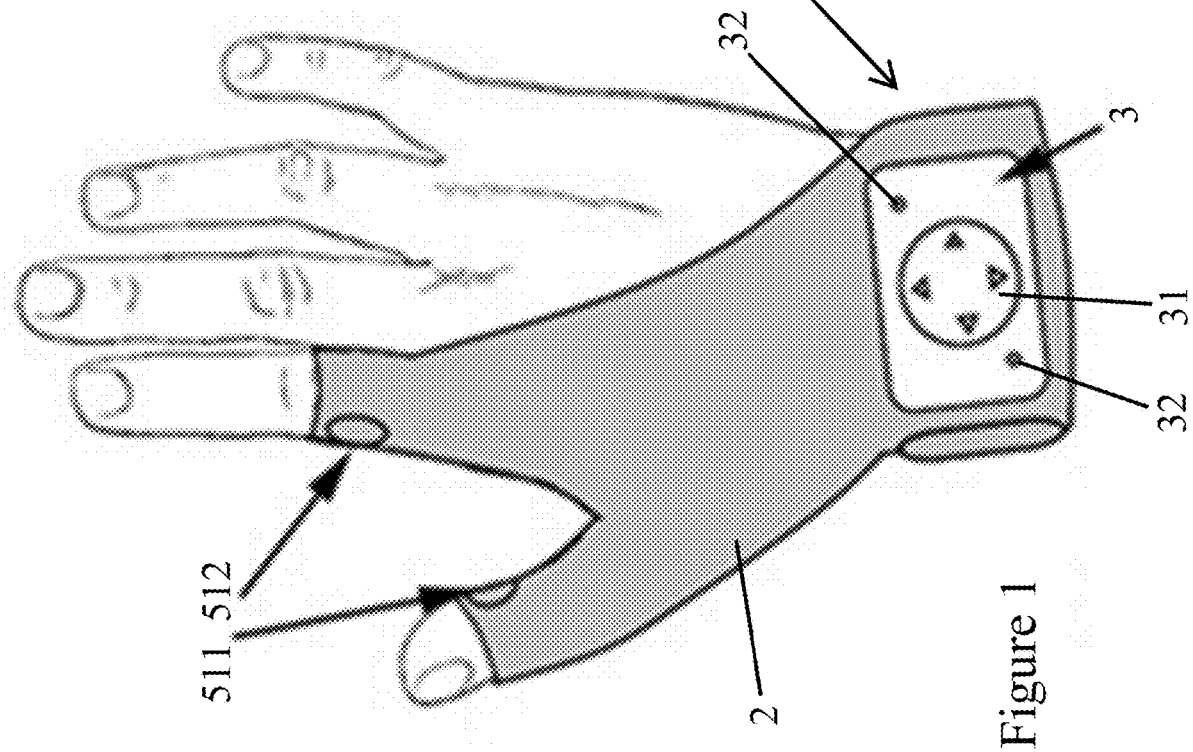
FIG. 1 shows a dorsal view of the wearable remote control device, worn on a user's hand, according to an embodiment of the present invention.
Figure 3:
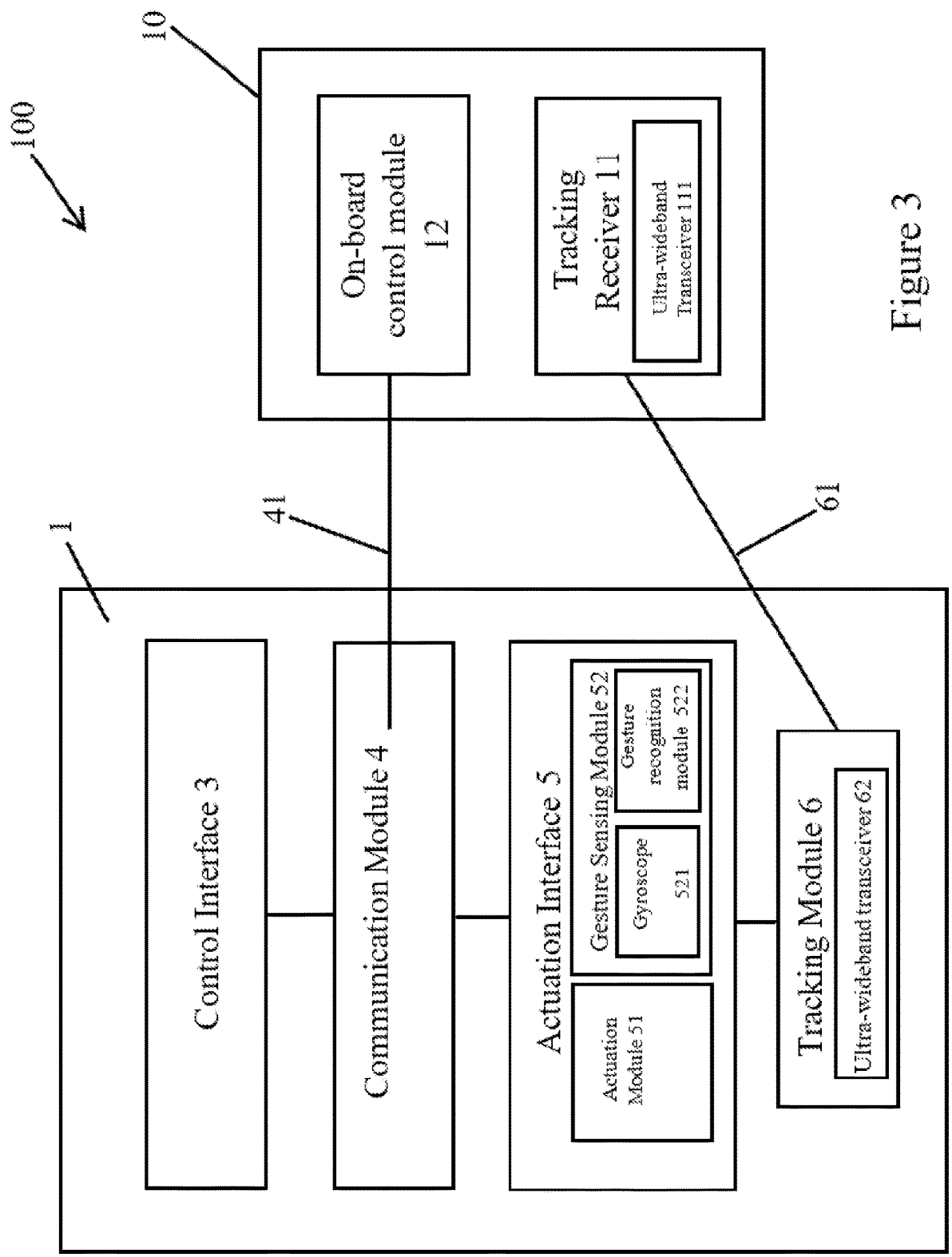
FIG. 3 shows a block diagram of the tracking system incorporating the wearable remote control device in FIG. 1 and FIG. 2.

According to FIG. 1 to FIG. 3, the present invention provides a wearable remote control device 1 for controlling a movable equipment 10. A movable equipment 10 is directed to any powered vehicular equipment capable of transporting objects, such as a goods handling vehicle. In particular, the wearable remote control device 1 would be ideal for controlling a forklift or a pallet stacker in a warehouse. According to the present invention, the wearable remote control device includes a wearable carrier 2 adapted for being worn by a user's hand, on which various electronic components and a power source, i.e., batteries, are mounted or attached (not shown). The wearable remote control device 1 includes a control interface 3 for receiving input from the user and converting the user's input into instructions, a communication module 4 for sending the instructions receivable by the goods handling vehicle 10, an actuation interface 5, and a tracking module 6 configured for being actuated by the actuation interface 5. The tracking module 6, upon actuated, provides a tracking signal 61 processable by an on-board control module 12 provided on the goods handling vehicle 10 for determining a traveling path with respect to the position and movement of the wearable remote control device 1.

As shown in FIG. 1 and FIG. 2, the wearable carrier 2 can be made in form of, for example, a wearable article, such as a glove which is ideal for releasably attaching to a hand of the user. For instance, the wearable remote control device 1 includes a wearable carrier 2 for wearing on a user's hand, such as a glove made of washable fabric or a suitable synthetic textile material such as polyester or nylon. Preferably, the glove 2 partially covers the user's hand with fingers exposed.

According to FIG. 1, the control interface 3 is located on a dorsal side of the wearable carrier 2. For example, the control interface 3 may include a number of control buttons or a knob for converting user's input into instructions. The control interface 3 can include a direction pad 31 consisted of four directional buttons such as forward, reverse, left and right. Through pressing of the directional buttons, the user would be able to instruct and control the movement of the goods handling vehicle 10. Optionally, other functional buttons 32 may also be provided on the control interface 3, such as an up button and a down button, for controlling the lifting and lowering action of the lifter of the goods handling vehicle 1. Preferably, the control interface 3 may be located at a position near the wrist of the user's hand wearing the remote control device 1, so that another hand of the user can easily access all of the buttons provided on the control interface 3.

To transmit the instructions to the goods handling vehicle 10, the communication module 4 receives the instructions from the control interface 3 and transmits the instructions through wireless RF signals receivable by the goods handling vehicle 10. Specifically, a wireless communication link 41 would be established between the goods handling vehicle 10 and the communication module 4 for transmission of data. Preferably, the wireless communication link 41 may utilize common wireless protocols based on IEEE 802.11 wireless standards, Bluetooth, Zigbee, or RF wireless technology. The user may be able to control the movement of the goods handling vehicle 10 by engaging the control interface 3, such as moving the goods handling vehicle 10 to proceed forward, reverse, turn left or turn right. In addition, the user may also control the raising and lowering of the lifter of the goods handling vehicle 10 through engaging the functional buttons 32.

Advantageously, the wearable remote control device 1 further provides a tracking function allowing the goods handling vehicle 10 to automatically track the movement of the user wearing the wearable remote control device 1. With the tracking module 6 activated on the wearable remote control device 1, the goods handling vehicle 10 would tag along the user at a predetermined distance. For instance, the tracking module 6 may include one or more ultrawideband transceiver 62 configured for emitting a tracking signal 61 receivable by a tracking receiver 11 on the goods handling vehicle 10. At least one processor may be provided in the on-board control module 12 provided on the goods handling vehicle 10 for determining a distance from the wearable remote control device 1 and a position relative to the wearable remote control device 1. The on-board control module may be configured to compute a traveling path based on the distance and relative position and control the movement of the goods handling vehicle 10 with respect to movement of the wearable remote control device. For example, by tracking the movement of the wearable remote control device 1, the goods handling vehicle 10 can determine its movement as to maintain the distance between the wearable remote control device 1 and the goods handling vehicle 10, and follow the movement of the wearable remote control device 1.

In particular, the activation of the tracking module 6 is solely performed on the wearable remote device 1 by the actuation interface 5. According to the present invention, the actuation interface 5 may provide at least two criteria for the activation of the tracking functionality. Specifically, the actuation interface 5 includes an actuation module 51 on the wearable carrier 2. For example, the actuation module 51 may be a touch interface or a button interface including at least one actuator 511 configured for engaging with a finger of the user. As shown in FIG. 2, the actuation module 51 includes a touch interface having two actuators 511 512. Preferably, the at least one actuator 511 512 is a capacitive touch sensor which can be activated simply by a touch of the user's finger. For ease of accessing, the at least one actuator 511 may be located at a location on the wearable carrier 2 reachable by a thumb or an index finger of the user's hand. Specifically, as shown, a first actuator 511 is located on the wearable carrier 2 in the vicinity of a thumb of the user's hand wearing the wearable carrier 2, and is therefore accessible by the index finger of the user's hand. As shown, a second actuator 512 may be provided on the wearable carrier 2 in the vicinity of an index finger of the user's hand wearing the wearable carrier 2, which can be accessible by the thumb of the user's hand. With the user's index finger engaging the first actuator 511 or the second actuator 512, the user's hand exhibits two different finger gestures when engaging the actuators. Advantageously, a command may be assigned for each of the actuators for activating or disabling a functionality of the goods handling vehicle 10, such as activating or disabling the tracking functionality.

The wearable remote control device 1 further includes a gesture sensing module 52 configured for detecting a predetermined hand gesture of the user's hand wearing the remote control device 1. For example, the predetermined hand gesture may be performed by, for example, laying the user's hand downward pointing to the ground, or upward pointing to the ceiling. Specifically, the gesture sensing module 52 may include a gyroscope 521 and a gesture recognition module 522. The gyroscope 521 senses the orientation of the user's hand based on measuring the tilt and lateral orientation of the user's hand, while the gesture recognition module 522 takes the measurements from the gyroscope 521 and compare the measured values with the values associated with the predetermined gesture. Based on the measured values, the gesture recognition module 522 can identify whether the user's hand is performing the predetermined hand gesture.

Preferably, the wearable remote control device 1 utilizes both the actuation module 51 and the gesture sensing module 52 for actuation of the tracking module 6 to provide tracking functionality. More preferably, the wearable remote control device 1 may be configured such that the user is required to first actuate the actuation module 51, while maintaining the actuation 51 module actuated, then actuate the gesture sensing module 52 by performing the predetermined hand gesture, in order to actuate the tracking functionality. For example, the tracking module 6 may be actuated by the index finger to engaging with the first actuator 511 while laying the user's hand downward pointing to the ground. With the tracking module 6 actuated, it provides a tracking signal receivable by the goods handling vehicle 10 to control its movement with respect to the wearable remote control device 1. Advantageously, the dual-actuation required by the actuation module 51 and the gesture sensing module 52 provides added safety when remote controlling the goods handling vehicle 10 by avoiding unintended activation of the tracking functionality.

The present invention further provides a tracking system 100 for use with a goods handling vehicle 10. Essentially, the tracking system 100 includes the wearable remote control device 1 discussed above and the tracking receiver 11 provided on the goods handling vehicle 10 for receiving the tracking signal 61 transmitted by the tracking module 6. The system 100 further includes the on-board control module 12 configured for processing the tracking signal 61 and controlling the movement of the goods handling vehicle 10 with respect to the tracking signal 61. For example, the system 100 may include an ultra-wideband transceiver 62, 111 on each of the goods handling vehicle 10 and the wearable remote control device 1 for determining, based on the tracking signal 61, a distance between the wearable remote control device 1 and the goods handling vehicle 10. Preferably, the ultra-wideband transceiver 62, 111 on each of the goods handling vehicle 10 and the wearable remote control device 1 may be configured for determining, based on the tracking signal 61, a relative position of the wearable remote control device 1 with respect to the goods handling vehicle 10. The tracking system 100 may be configured such that upon actuation of the tracking module 6 of the wearable remote control device 1, the on-board control module 12 controls, based on the determined distance and the relative position, the movement of the goods handling vehicle 10 to follow a path after the wearable remote control device 1.

It should be understood that although the specification is described in terms of embodiments, not every embodiment includes only a single technical solution. This description of the specification is merely for the sake of clarity. Those skilled in the art should regard the specification as a whole, and the technical solutions in the embodiments can also be combined appropriately to form other embodiments that can be understood by those skilled in the art. However, the protection scope of the present invention is defined by the appended claims rather than the foregoing description, and it is therefore intended that all changes that fall within the meaning and scope of equivalency of the claims are included in the present invention and any reference signs in the claims should not be regarded as limiting the involved claims.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A wearable remote control device for controlling a movable equipment, comprising:
    a wearable carrier adapted for being worn on a user's hand;
    a control interface configured for converting user's input into instructions;
    a communication module configured for sending the instructions receivable by the movable equipment;
    an actuation interface; and
    a tracking module configured for being actuated by the actuation interface;
    wherein the actuation interface comprises:
        an actuation module, provided on the wearable carrier, adapted for being actuated by the user's hand; and
        a gesture sensing module configured for detecting a predetermined hand gesture performed by the user's hand;
    upon the predetermined gesture performed by the user's hand being detected by the gesture sensing module and the actuation module being actuated by the user's hand, the actuation interface actuates the tracking module and provides a tracking signal receivable by the movable equipment for determining a traveling path with respect to movements of the wearable remote control device.

2. The wearable remote control device according to claim 1, wherein the actuation module comprises a touch interface.

3. The wearable remote control device according to claim 1, wherein the actuation module comprises a button interface.

4. The wearable remote control device according to claim 1, wherein the actuation module comprises a touch interface or a button interface, and the touch interface or button interface comprises at least one actuator configured for engaging with a finger of the user.

5. The wearable remote control device according to claim 4, wherein the at least one actuator is a capacitive touch sensor.

6. The wearable remote control device according to claim 4, wherein the at least one actuator is located at a location on the wearable carrier reachable by a thumb or an index finger of the user's hand.

7. The wearable remote control device according to claim 4, wherein the at least one actuator is located on the wearable carrier in a vicinity of a thumb of the user's hand wearing the wearable carrier.

8. The wearable remote control device according to claim 7, wherein the actuation module is actuated by the index finger engaging with the at least one actuator.

9. The wearable remote control device according to claim 4, wherein the at least one actuator is located on the wearable carrier in a vicinity of an index finger of the user's hand wearing the wearable carrier.

10. The wearable remote control device according to claim 9, wherein the actuation module is actuated by the thumb engaging with the at least one actuator.

11. The wearable remote control device according to claim 1, wherein the gesture sensing module comprises a gyroscope and a gesture recognition module configured for identifying the predetermined hand gesture performed by the user's hand.

12. The wearable remote control device according to claim 1, wherein the gesture sensing module is configured to detect the predetermined gesture of which the user's hand wearing the wearable carrier is pointing downward.

13. The wearable remote control device according to claim 4, wherein the tracking module is actuated by the finger engaging the at least one actuator while with the user's hand wearing the wearable carrier performing the predetermined gesture.

14. The wearable remote control device according to claim 1, wherein the wearable carrier is a glove adapted for partially covering the user's hand with its fingers exposed.

15. The wearable remote control device according to claim 1, wherein the control interface comprises directional control buttons for controlling the movable equipment to move forward, reverse, left or right.

16. The wearable remote control device according to claim 15, wherein the control interface comprises control buttons for controlling the movable equipment to lift up or lower down.

17. A tracking system for a movable equipment, comprising:
the wearable remote control device according to claim 1;
a tracking receiver provided on the movable equipment for receiving the tracking signal;
an on-board control module configured for processing the tracking signal and controlling the movement of the movable equipment with respect to the tracking signal.

18. The tracking system according to claim 17, wherein the tracking module and the tracking receiver each comprise an ultra-wideband transceiver for determining, based on the tracking signal, a distance between the wearable remote control device and the movable equipment.

19. The tracking system according to claim 17, wherein the tracking module and the tracking receiver each comprise an ultra-wideband transceiver for determining, based on the tracking signal, a position of the wearable remote control device with respect to the movable equipment.

20. The tracking system according to any one of claim 17, wherein the tracking system is configured such that upon actuation of the tracking module, the on-board control module controls the movable equipment to follow a path after the wearable remote control device.

* * * * *